United States Patent [19]

Pellet et al.

[11] 4,407,736
[45] Oct. 4, 1983

[54] CATALYST AND PROCESS OF PREPARING

[75] Inventors: Regis J. Pellet; Michael J. Gradassi, both of Wheaton, Ill.; Ralph J. Bertolacini, Chesterton, Ind.

[73] Assignee: Standard Oil Company, (Indiana), Chicago, Ill.

[21] Appl. No.: 258,372

[22] Filed: Apr. 28, 1981

Related U.S. Application Data

[62] Division of Ser. No. 92,569, Nov. 8, 1979, Pat. No. 4,298,461.

[51] Int. Cl.$^3$ ........................ B01J 21/12; B01J 23/64
[52] U.S. Cl. .................................... 502/230; 502/241
[58] Field of Search .................. 252/455 R, 454, 460, 252/441

[56] References Cited

U.S. PATENT DOCUMENTS

| | | | |
|---|---|---|---|
| 2,478,916 | 8/1949 | Haensel et al. | 252/455 R |
| 3,180,839 | 4/1965 | Connor et al. | 252/455 R |
| 3,278,418 | 10/1966 | Wilson | 252/454 X |
| 4,062,808 | 12/1977 | Gandhi et al. | 252/454 |

Primary Examiner—Carl F. Dees
Attorney, Agent, or Firm—James R. Henes; William T. McClain; William H. Magidson

[57] ABSTRACT

A hydrocarbon conversion catalyst comprising at least one platinum-group metal deposited on a composite comprising (I) alumina and (II) rhenium deposited on silica. The catalyst eliminates the need for presulfiding treatment required by conventional rhenium-promoted catalyst in reforming service, without comparative loss in reforming performance.

9 Claims, 3 Drawing Figures

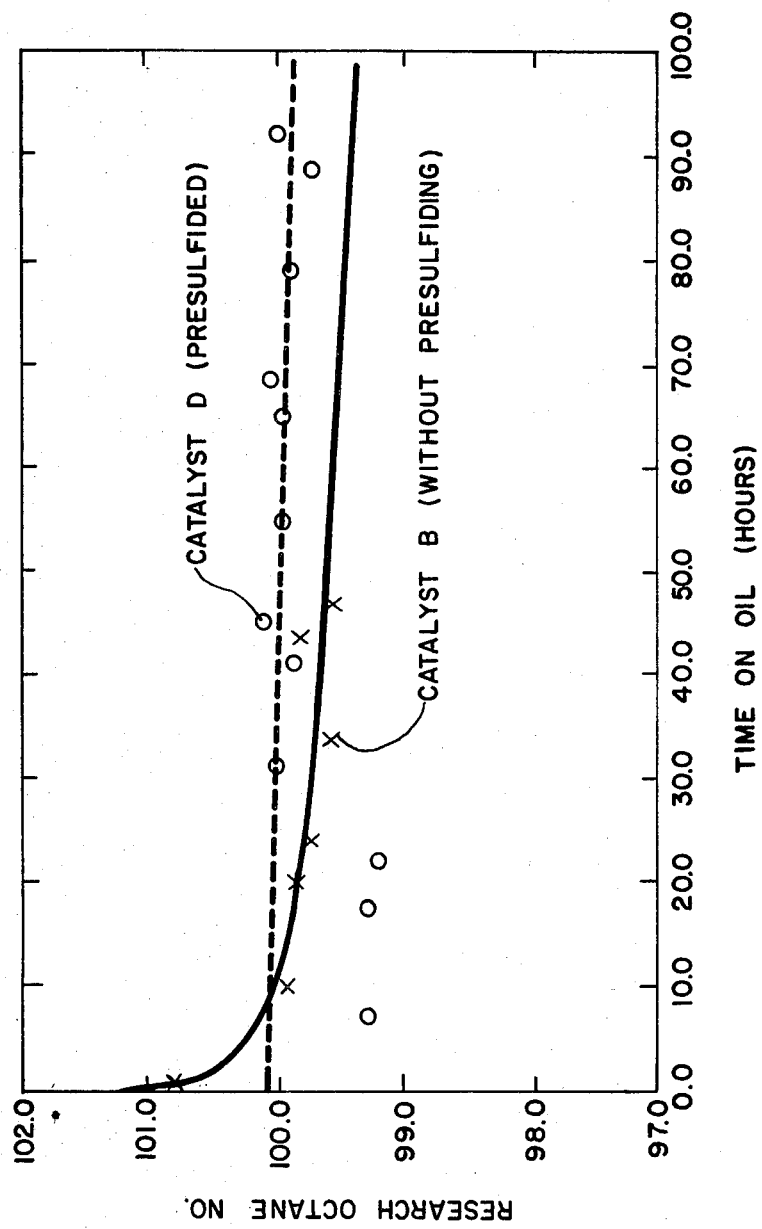

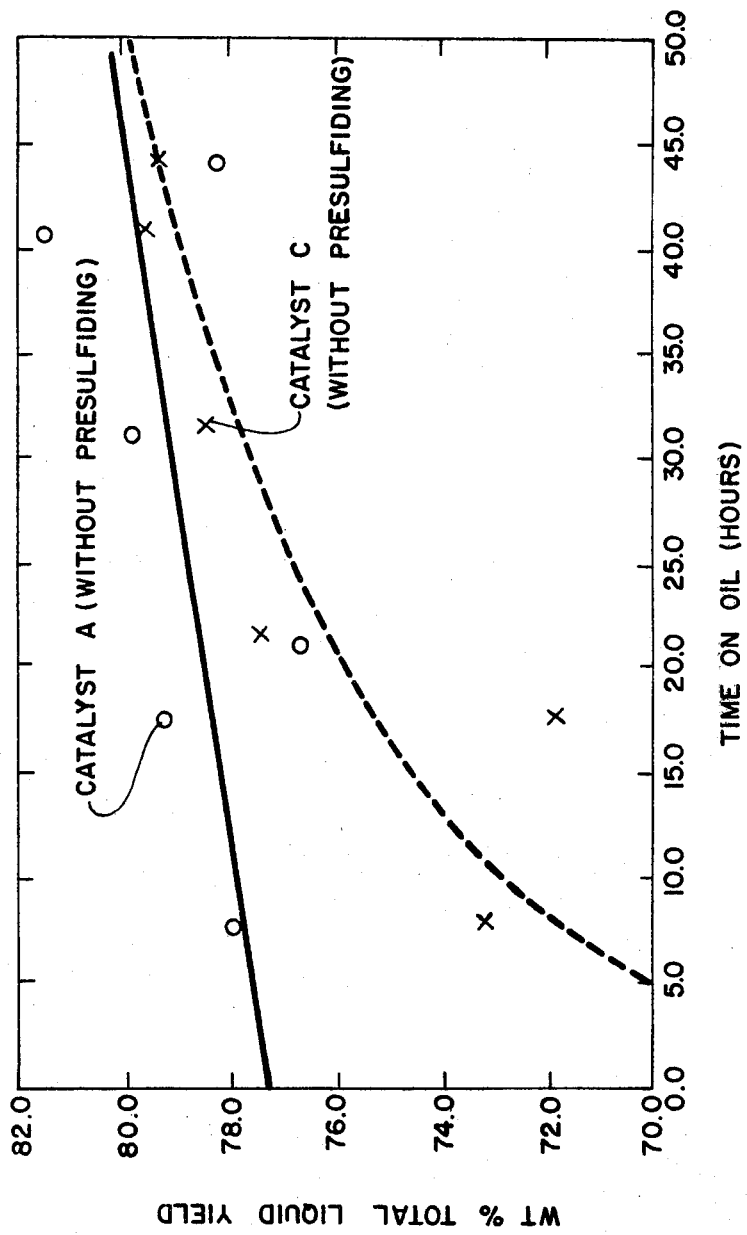

CATALYST AND PROCESS OF PREPARING

This a division, of application Ser. No. 92,569, filed Nov. 8, 1979 now U.S. Pat. No. 4,298,461.

BACKGROUND OF THE INVENTION

This invention relates to the preparation of a new catalyst which is particularly useful in hydrocarbon reforming processes. More particularly, this invention relates to a new rhenium-promoted catalyst which does not require presulfiding treatment in hydrocarbon reforming service.

In the petroleum refining industry, catalytic reforming is a widely employed commercial process for upgrading the antiknock quality of naphtha as a blending stock for motor fuels, particularly gasoline. Typically, the most desirable reaction taking place during reforming is the dehydrogenation of naphthenes to form aromatics and hydrogen, although a number of other reactions take place including cyclization of normal paraffins to naphthenes, isomerization of normal paraffins to isoparaffins, and hydrocracking which can be excessive and in severe conditions termed "hydrogenolysis" produces unwanted light gases, decreasing yield of gasoline-boiling products.

Catalysts containing platinum group metals have been conventionally employed in reforming processes in order to promote dehydrogenation reactions which are also favored by operation at lower pressures and high severity. However, operation under such conditions has generally caused deactivation of the typical platinum catalyst due to coke formation on the catalyst requiring frequent catalyst regeneration. In U.S. Pat. No. 3,415,737 (1968), which is incorporated herein by reference, Kluksdahl discloses that alumina supported reforming catalysts comprising a rhenium component as a promoter for typical platinum catalyst provide an improved activity maintenance permitting operation at lower pressure and higher severity to allow improved selectivity for gasoline yields without shortening regeneration cycle times. However, this patent points out that a disadvantage of the disclosed rhenium-promoted catalyst is the necessity to subject the catalyst to presulfiding treatment in order to prevent excessive hydrocracking in the reforming process which has been a commercial disadvantage with the employment of such rhenium-promoted catalyst compounded by the fact that it is generally necessary to resulfide such catalyst after each regeneration. Furthermore, if such presulfiding treatment results in the catalyst becoming oversulfided, the reforming activity of the catalyst is poisoned. Thus, only when the correct sulfur level is achieved in the presulfiding treatment have the benefits of using rhenium-promoted platinum reforming catalyst been obtainable. Typical commercial presulfiding treatment is carried out by contacting the bed of catalyst with a mixture of hydrogen sulfide and a gas such as hydrogen or nitrogen.

Antos et al. in U.S. Pat. No. 4,124,491 (1978) disclose a reforming process employing a selectively sulfided acidic multi metallic catalytic composite comprising a combination of catalytically effective amounts of a platinum group component, a sulfided rhenium component and a halogen component with a porous carrier material formed from Ziegler alumina; the patent does not suggest that the catalyst contain a silica component. Furthermore, as pointed out in this patent in column 12, beginning at line 43, the disclosed catalyst requires a selective sulfiding treatment in order to convert substantially all of the rhenium component to a sulfided state.

Collins et al. in U.S. Pat. No. 4,124,490 (1978) disclose a two-stage reforming process employing a catalyst comprising a major amount of a porous solid support, preferably alumina, at least one platinum-group metal component, and at least one rhenium component; in addition to alumina, the solid porous support can contain minor proportions of other well-known refractory inorganic oxides such as silica, zirconia, magnesia, and the like; however, "the most preferred support is substantially pure alumina derived from hydrous alumina predominating in alumina monohydrate." Collins et al. do not disclose an example of a catalyst containing silica, nor do they discuss the presulfiding treatment of the catalyst to prevent excessive hydrocracking in the reforming process.

Wilson et al. in U.S. Pat. No. 3,986,947 (1976) disclose a reforming process employing a catalyst composed of a noble metal, particularly platinum, deposited or impregnated on silica which is dispersed in an alumina matrix; while Wilson et al. suggest that rhenium can also be deposited on the silica no example of a catalyst containing rhenium is presented nor is consideration given to consequent presulfiding treatment. In addition, Wilson et al do not suggest that the alumina matrix can be impregnated with the noble metal. Moreover, Wilson et al. limit the amount of alumina in their catalyst to about 5-30 wt. %, preferably not more than 15 wt. % of the catalyst.

We have now developed a new rhenium-promoted catalyst which eliminates the need to presulfide the catalyst in hydrocarbon reforming operations, which has been a necessary pretreatment of conventional rhenium-promoted catalyst in order to prevent their excessive hydrocracking activity. The catalyst of this invention comprises a rhenium component which is supported on silica and a platinum-group component deposited on both the silica and on an alumina component in composite which alumina is preferably the major component of the catalyst on weight basis. This catalyst appears to allow the interaction of the silica support for the rhenium and a portion of the platinum-group metal component to facilitate reduction of the rhenium under reforming conditions wherein the reduced rhenium component does not exhibit the excessive hydrocracking activity experienced with unsulfided conventional rhenium-promoted reforming catalyst; in addition, the catalyst exhibits the superior reforming activity afforded by a portion of the platinum-group metal supported on the alumina component.

The general object of this invention is to provide a rhenium-promoted catalyst which can be employed in hydrocarbon reforming processes without need for the conventional presulfiding treatment required by the prior art rhenium-promoted catalysts. Another object is to eliminate such presulfiding treatment without sacrifice in the reforming performance of the catalyst.

The objects of this invention can be attained with a catalyst comprising at least one platinum-group metal deposited on a composite comprising (1) alumina and (2) rhenium deposited on silica.

Briefly the catalyst of this invention can be prepared by a method comprising:

(1) forming a composition comprising rhenium deposited on silica;

(2) drying the composition of step (1);
(3) forming a composition comprising the product of step 2 and an alumina component;
(4) impregnating the composition of step 3 with a solution comprising platinum-group metal; and
(5) calcining the product of step 4.

BRIEF DESCRIPTION OF THE DRAWING

FIG. 2 presents graphical comparison of the research octane number of the reformed liquid product employing an embodiment of the catalyst of this invention and employing a conventional rhenium-promoted reforming catalyst subjected to presulfiding treatment.

FIG. 3 presents graphical comparison of the yield performance of two embodiments of the catalyst of this invention prepared with different silica gel particle sizes.

Figure 1:
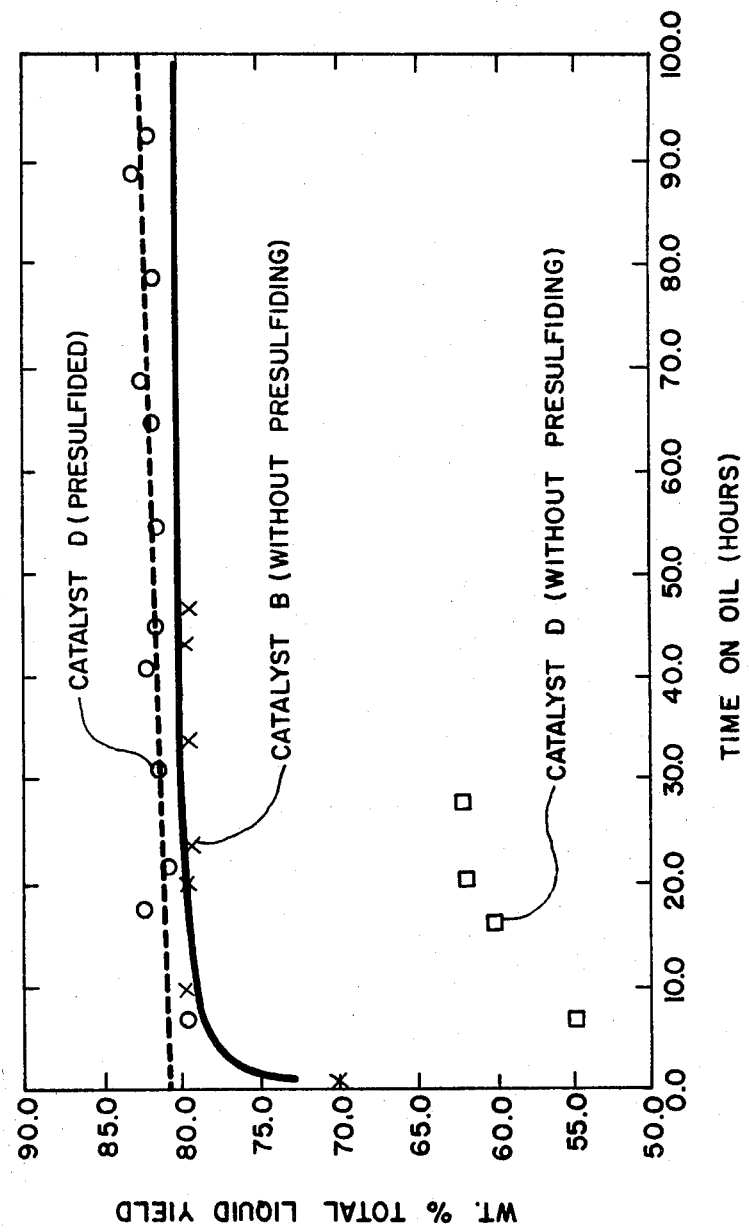
FIG. 1 presents graphical comparison of the reformed liquid product yield performance of an embodiment of the catalyst of this invention and the performance of a conventional rhenium-promoted reforming catalyst subjected to presulfiding treatment in one case and without such presulfiding treatment in another case.

When employed in hydrocarbon reforming operations, the catalyst of this invention comprises about 0.01 to about 3 wt. % rhenium and more preferably 0.1 to about 2 wt. % rhenium calculated as the elemental metal. The platinum-group metal component of the catalyst of this invention is employed at typical reforming levels of about 0.01 to about 3 wt. %, more preferably 0.2 to 1 wt. % calculated as elemental metal; suitable platinum- group metals include platinum, iridium, ruthenium, rhodium, palladium, or mixtures thereof, with platinum being preferred for reforming activity.

The silica component of the catalyst of this invention can be incorporated using suitable high surface area silica such as typical commercial silica gel having a surface area of about 100 to about 600 square meters per gram and average pore diameter generally in the range of about 80-300 Å. When employed in hydrocarbon reforming operations, conventional active alumina is the major component in the catalyst of this invention, present in the amount of about 65-95 wt. %, preferably about 75-85 wt. % of the finished catalyst; while the alumina component, supporting a portion of the platinum-group metal component, provides the catalyst of this invention with excellent reforming activity, the silica component can be employed in the amount of about 5-35 wt. %, preferably 15-25 wt. % of the catalyst, sufficient to support the rhenium component and a portion of the platinum-group metal component.

In order to enhance the reforming performance of the catalyst of this invention a halogen component, preferably combined chlorine, can be incorporated in the range of about 0.1-2 wt. %, preferably about 0.1-1 wt. % of the catalyst. A zeolite component, for example mordenite crystalline aluminosilicate, can also be incorporated in the catalyst of this invention, particularly when the cracking activity of the catalyst is desirably augmented in hydrocarbon reforming service.

Broadly, the catalyst of this invention can be prepared by forming a silica supported rhenium composition by suitable technique such as coprecipitation, ion exchange, or more preferably by impregnation of commercial, high-surface area silica gel with a solution, typically aqueous, comprising a rhenium compound such as perrhenic acid, ammonium perrhenate, or potassium perrhenate. Prior to such impregnation, the silica gel can be ground to pass a 100 mesh screen (U. S. Sieve Series) and more preferably 325 mesh. The rhenium-impregnated silica is dried generally at about 200°–800° F. (93°–427° C.), preferably 200°–500° F. (93°–260° C.) for about 3–20 hours. After drying, the rhenium-impregnated silica is combined with an alumina component to form a composite. While a particulate alumina can be used to form the composite, preferably, in order to facilitate such combination, a typical commercial alumina hydrosol can be blended with the rhenium-impregnated silica after which the resulting sol blend can be gelled, for example, by addition of ammonia solution, after which the gelled blend can be dried (and preferably calcined). While a platinum-group metal component can be incorporated prior to or during the blending of the silica and alumina sol, it is preferred to impregnate the dried composite with a solution of a platinum-group metal compound, particularly platinum compounds such as chloroplatinic acid, ammonium chloroplatinate and polyamine platinum salts. The use of platinum-group metal chloride solutions such as aqueous chloroplatinic acid, preferably in mixture with haloacid, facilitates incorporation of at least a minor quantity of halogen component in the catalyst which can improve the reforming activity of the catalyst as disclosed in the aforementioned U.S. Pat. No. 4,124,491. After drying the material impregnated with platinum-group metal, further halogen can be incorporated, for example by reimpregnation with haloacid for example hydrochloric acid. The final composite is dried generally at about 200°–400° F. (93°–204° C.) for about 3–30 hours and calcined at about 900°–1100° F. (482°–593° C.) for about 1–20 hours.

A preferred embodiment of the catalyst of this invention can be prepared using silica gel ground to pass 325 mesh (U.S. Sieve Series) that is particles 45 microns or smaller in effective diameter, in order to provide best practical intimate association of the impregnated silica and alumina components of the composite catalyst; such preferred embodiment of the catalyst comprises about 15–25 wt. % silica ($SiO_2$), about 0.2–0.7 wt. % rhenium and about 0.2–0.7 wt. % platinum, each being calculated as the elemental metal, about 0.1–1 wt. % chlorine and about 75–85 wt. % alumina.

The catalyst of this invention is especially effective without requiring presulfiding treatment in hydrocarbon reforming service for the production of high-octane-number blending stock for motor fuel in operations reforming naphthas, both virgin and cracked naphtha, and other hydrocarbon streams typically in the gasoline boiling range. Typically, a naphtha will have a boiling range within about 70° F. (21.1° C.) to about 500° F. (260° C.), preferably, about 180° F. (82° C.) to about 400° F. (204° C.). Since these feedstocks can contain appreciable amounts of nitrogen and sulfur compounds, which can deactivate the catalyst in a reforming process, such feedstock is typically subjected to prior suitable hydrotreatment, such as hydrofining. Thus, prior to a reforming process using the catalyst of the present invention, the feedstock should have generally no more than about 35 ppm sulfur by weight, preferably less than about 1 ppm sulfur. The catalyst of this invention can be employed in any suitable reforming process such as the typical commercial catalytic reforming processes, for example the Ultraforming Process, described in HYDROCARBON PROCESSING, Vol. 57, No. 9, September, 1978, pp. 159-166, which is incorporated herein by reference. Such processes include semi-regenerative reforming processes and regenerative or cyclic processes. In a semi-regenerative reforming process, the flow of hydrocarbons is stopped to all of the multiple, fixed-bed reactors in the system and the catalyst in ach of the reactors is regenerated. In a regenerative or cyclic reforming system, one of the reactors is removed from the system and is replaced by an auxiliary "swing" reactor. Reforming of hydrocarbons continues in such a system, while catalyst in the reactor that has been removed from the system is regenerated.

Typical operating conditions of the reforming process using the catalyst of the present invention comprise an inlet temperature of about 900° F. (482° C.) to about 1,020° F. (549° C.), a pressure of about 50 psig (446 KPa) to about 1,000 psig (6,996 KPa), a weight hourly space velocity (WHSV) of about 0.5 weight unit of hydrocarbon per hour per weight unit of catalyst to about 10 weight units of hydrocarbon per hour per weight unit of catalyst, and a hydrogen addition rate of about 1,500 standard cubic feet per barrel [SCFB] (267 m³/m³) to about 15,000 SCFB (2,670 m³/m³). Preferred operating conditions comprise an inlet temperature of about 940° F. (504° C.) to about 980° F. (527° C.), a pressure of about 50 psig (446 KPa) to about 300 psig (2,170 KPa), a WHSV of about 1 weight unit of hydrocarbon per hour per weight unit of catalyst to about 8 weight units of hydrocarbon per hour per weight unit of catalyst, and a hydrogen addition rate of about 3,000 SCFB (534 m³/m³) to about 10,000 SCFB (1,780 m³/m³).

The following examples are illustrative of this invention but do not indicate limitation upon the scope of the claims.

EXAMPLE 1

An embodiment of the catalyst of this invention, designed Catalyst A and prepared to contain approximately 20 wt. % silica (SiO$_2$), 0.4 wt. % Platinum, 0.2 wt. % Rhenium, 0.4 wt. % Chlorine, and 80 wt. % alumina (Al$_2$O$_3$), was prepared as follows: a 10.0 gram sample of Davison Grade 59 silica gel, obtained from the Davison Chemical Division of W. R. Grace & CO., was ground to pass 325 mesh (U.S. Sieve Series). A 9.8 wt. % rhenium solution was prepared by dissolving powdered rhenium metal in 30 wt. % hydrogen peroxide solution to form perrhenic acid; the solution was boiled to decompose excess peroxide. An impregnating solution was prepared by diluting 1.0 g of the 9.8 wt. % rhenium solution with 27.0 g of distilled water. The ground silica was impregnated with the perrhenic acid solution and the impregnated silica was dried at a temperature of approximately 250° F. (121° C.) for approximately 16 hours and further dried at a temperature of about 500° F. (260° C.) for 3 hours. A 9.5 g sample of the dried, impregnated silica was blended into 408 g of alumina hydrosol (9.5 wt. % Al$_2$O$_3$) obtained from the American Cyanamid Company and the resulting blend was gelled with 10 cc of concentrated ammonia. The gelled blend was then dried overnight (approximately 16 hours) at 250° F. (121° C.) and calcined at 1,000° F. (538° C.) for approximately 3 hours. A 54.5 gram sample of the calcined material was impregnated with a solution containing 0.55 g of chloroplatinic acid (H$_2$PtCl$_6$-40 wt. % Pt) diluted with 53.2 g of distilled water; this material was dried at 250° F. (121° C.) overnight (approximately 16 hours) and calcined at 1,000° F. (538° C.) for about 3 hours.

EXAMPLE II

Another embodiment of a catalyst of this invention, designated Catalyst B was prepared to contain double the levels of rhenium and chlorine in comparison to Catalyst A.

Catalyst B was prepared as follows: a sample of Davison Grade 59 silica gel, obtained from the Davison Chemical Division of W. R. Grace & Co., was ground to pass 100 mesh (U. S. Sieve Series). A 50 wt. % rhenium solution was prepared by dissolving powdered rhenium metal in 30 wt. % hydrogen peroxide solution to form perrhenic acid; the solution was boiled to decompose excess peroxide. An impregnating solution as prepared by diluting 0.85 g of the 50 wt. % rhenium solution with 30 g of distilled water. A 20.75 g sample of the ground silica was impregnated with the perrhenic acid solution and the impregnated silica was dried at a temperature of approximately 250° F. (121° C.) for approximately 2 hours and further dried at a temperature of about 500° F. (260° C.) for 3 hours. A 20.0 g sample of the dried, impregnated silica was blended into 840 g of alumina hydrosol (9.5 wt. % Al$_2$O$_3$) obtained from the American Cyanamid Company and the resulting blend was gelled with concentrated ammonia. The gelled blend was then dried overnight (approximately 16 hours) at 250° F. (121° C.). The dried material was impregnated with a solution containing 1.0 g of chloroplatinic acid (H$_2$PtCl$_6$-40 wt. % Pt) diluted with 100 g of distilled water and dried at 250° F. (121° C.) for 20 hours. The platinum-impregnated material was reimpregnated with a solution containing 1.55 g of concentrated hydrochloric acid (36.5 wt. % Cl) diluted with 100 g of distilled water. This material was then dried at 250° F. (121° C.) for approximately 16 hours and calcined at 1,000° F. (538° C.) for about 3 hours. Composition of Catalyst B as prepared follows:

CATALYST B

Composition, wt. %

0.4% Platinum
0.4% Rhenium
0.8% Chlorine
20% Silica (SiO$_2$)
80% Alumina (Al$_2$O$_3$)

EXAMPLE III

An embodiment of the catalyst of this invention, designated Catalyst C, was prepared using the method described for the preparation of Catalyst A with the major exception that Catalyst C was prepared using silica gel particles smaller than 100 mesh but larger than 200 mesh (U.S. Sieve Series). Composition of Catalyst C as prepared follows:

CATALYST C

Composition, wt. %

0.4% Platinum
0.2% Rhenium
0.4% Chlorine
20% Silica (SiO$_2$)
80% Alumina (Al$_2$O$_3$)

EXAMPLE 4

For comparative purposes, Catalyst D, representing a typical commercial catalyst without a silica component, was formed from a composite of four samples of the same commercially prepared platinum-rhenium reforming catalyst, obtained as 0.37 PRHF from the American Cyanamid Company, nominally containing 0.37 wt. % platinum and 0.37 wt. % rhenium on alumina support. The composite was adjusted to 0.8 wt. % combined chlorine content by impregnation of the composite with aqueous hydrochloric acid with subsequent drying and calcining in the manner previously described.

CATALYST PERFORMANCE

Catalysts A, B, C, and D were evaluated in reforming a desulfurized Mid-Continent naphtha feed, with properties presented as follows:

| PROPERTIES OF FEED | |
|---|---|
| Gravity, °API | 55.1 |
| Specific Gravity | 0.7583 |
| Sulfur, ppm | 0.5 |
| Nitrogen, ppm | 0.7 |
| Chloride, ppm | 1.0 |
| Water, ppm | 2 |
| Molecular weight | 113.8 |
| Hydrocarbon type, vol. % | |
| Paraffins | 48.7 |
| Naphthenes | 37.1 |
| Aromatics | 14.2 |
| Research Octane No., clear | 50.7 |

Each test was conducted in a bench-scale test unit employing an isothermal fixed bed of catalyst. The hydrocarbon feedstock and hydrogen (once-through) were mixed and the resulting hydrogen-hydrocarbon mixture was charged to a reactor having an inside diameter of 0.622 inch. The reactor, which was 20 inches long, was immersed in a hot salt bath containing Du Pont HITEC. The temperatures in the reactor were determined by employing a manually-operated, concentric thermocouple, that was movable along the length of the reactor. The hydrocarbon feed was pumped by a positive-displacement Ruska pump. The liquid product was collected in a high-pressure receiver. Liquid products were weighed and analyzed on a Hewlett-Packard research chromatograph, Model 5830A. The gas yield was measured by wet test meter and analyzed with a Varian Aerograph chromatograph, Series 1200. Research octane numbers were estimated by gas chromatography-research octane correlation.

Each catalyst sample was charged to a reactor in the form of 20-to-45 mesh (U.S. Sieve Series) material. A 20-gram sample of catalyst was used in each test. The catalyst bed was supported on a layer of 6.2 cc of 3.0 mm glass beads.

After the reactor containing the catalyst was placed in the test unit, the catalyst was pretreated. Catalysts A, B, and C were pretreated by being subjected to an air soak for 1 hr at a temperature of 930° F. (499° C.) and an air flow rate of 0.0085 cu ft per hr, followed by a nitrogen purge, and then reduced with hydrogen for 1 hr at test pressure and a temperature of 930° F. (499° C.) and a hydrogen flow rate of 1.95 cu ft per hr. In Run 2, Catalyst D was pretreated as specified for Catalyst A, except that the air soak was followed by a presulfiding step prior to the hydrogen reduction. The sulfiding was conducted for 0.25 hr by means of a gas mixture comprising 8 vol. % hydrogen sulfide in hydrogen at a temperature of 930° F. (499° C.) and a pressure of 400 psig (2,859 KPa). In Run 3, Catalyst D was not subjected to presulfiding treatment.

The operating conditions that were employed in each run were as follows: an outlet temperature of 930° F. (499° C.), unless otherwise specified; a pressure of 300 psig (2,170 KPa); a WHSV of 2.3 gm of hydrocarbon per hour per gm of catalyst; and a hydrogen-to-hydrocarbon mole ratio of 5.

The results of the Runs 1-5 are presented hereinafter in Tables I through V. The time on oil represents the time consumed during all of the periods for preceding samples plus half of the time of the period during which the particular samples was obtained.

Results of Run 1, employing Catalyst B without presulfiding treatment, are presented in Table I.

Results of Run 2, employing Catalyst D subjected to presulfiding treatment, are presented in Table II.

Results of Run 3, employing Catalyst D without presulfiding treatment, are presented in Table III.

Results of Runs 4 and 5, employing Catalysts A and C (without presulfiding treatment) respectively are presented in Tables IV and V.

TABLE I

| Liquid Product Using Catalyst B | | | | |
|---|---|---|---|---|
| TIME (HOURS) | RESEARCH OCTANE | PAR-AFFIN YIELD | AROMATIC YIELD | TOTAL YIELD |
| 1.0 | 100.7 | 17.9 | 51.9 | 69.8 |
| 10.3 | 99.9 | 21.4 | 58.0 | 79.4 |
| 20.3 | 99.8 | 21.6 | 57.7 | 79.3 |
| 24.0 | 99.7 | 21.6 | 57.4 | 79.1 |
| 34.1 | 99.5 | 22.1 | 57.1 | 79.2 |
| 43.6 | 99.8 | 21.6 | 57.9 | 79.4 |
| 46.8 | 99.5 | 21.9 | 57.2 | 79.1 |

TABLE II

| Liquid Product Using Catalyst D (presulfided) | | | | |
|---|---|---|---|---|
| TIME (HOURS) | RESEARCH OCTANE | PAR-AFFIN YIELD | AROMATIC YIELD | TOTAL YIELD |
| 7.4 | 99.3 | 20.1 | 59.1 | 79.3 |
| 17.8 | 99.3 | 20.5 | 61.3 | 81.9 |
| 22.0 | 99.2 | 20.1 | 60.5 | 80.6 |
| 31.3 | 100.0 | 18.9 | 61.9 | 80.9 |
| 41.2 | 99.8 | 19.7 | 61.9 | 81.7 |
| 45.1 | 100.1 | 18.9 | 62.1 | 81.1 |
| 55.0 | 99.9 | 19.4 | 61.4 | 80.9 |
| 64.9 | 99.9 | 19.2 | 61.9 | 81.1 |
| 68.7 | 100.0 | 19.0 | 62.7 | 81.7 |
| 78.8 | 99.8 | 19.6 | 61.3 | 81.0 |
| 88.7 | 99.7 | 19.9 | 62.6 | 82.5 |
| 92.4 | 100.0 | 18.9 | 62.4 | 81.3 |

TABLE III

| Liquid Product Using Catalyst D (without presulfiding) | | | | |
|---|---|---|---|---|
| TIME (HOURS) | OCTANE | PAR-AFFIN YIELD | AROMATIC YIELD | TOTAL YIELD |
| 7.2 | 104.4 | 9.0 | 45.7 | 54.7 |
| 16.5 | 103.5 | 11.4 | 48.6 | 60.1 |
| 20.6 | 103.4 | 11.7 | 50.2 | 61.9 |
| 28.3 | 103.3 | 11.9 | 50.0 | 62.0 |

TABLE IV

| | Liquid Product Using Catalyst A | | | |
|---|---|---|---|---|
| TIME (HOURS) | RESEARCH OCTANE | PAR- AFFIN YIELD | AROMATIC YIELD | TOTAL YIELD |
| 7.9 | 101.0 | 16.8 | 61.1 | 77.9 |
| 17.6 | 101.3 | 17.9 | 61.3 | 79.2 |
| 21.4 | 100.5 | 18.4 | 58.2 | 76.6 |
| 31.4 | 99.3 | 20.8 | 59.0 | 79.8 |
| 40.8 | 99.8 | 20.7 | 60.7 | 81.4 |
| 44.1 | 100.1 | 20.0 | 58.2 | 78.2 |

TABLE V

| | Liquid Product Using Catalyst C | | | |
|---|---|---|---|---|
| TIME (HOURS) | RESEARCH OCTANE | PAR- AFFIN YIELD | AROMATIC YIELD | TOTAL YIELD |
| 8.0 | 101.2 | 17.4 | 55.8 | 73.2 |
| 17.8 | 100.9 | 17.3 | 54.6 | 71.9 |
| 21.6 | 100.5 | 19.1 | 58.3 | 77.4 |
| 31.6 | 100.1 | 20.2 | 58.3 | 78.4 |
| 40.9 | 100.0 | 20.2 | 59.3 | 79.5 |
| 44.2 | 99.8 | 20.5 | 58.7 | 79.2 |

FIG. 1 showing graphical comparison of Runs 1-3 demonstrates that the total liquid product yield using Catalyst B, an embodiment of this invention, is substantially equivalent to the total liquid product yield using the presulfided Catalyst D representing commercial rhenium-promoted Catalyst; moreover, Run 3 using Catalyst D without presulfiding treatment resulted in substantially poorer liquid product yield in comparison to yield produced using Catalyst B which did not require presulfiding treatment to control hydrocracking.

FIG. 2 demonstrates that Catalyst B does not require presulfiding treatment for substantially equivalent performance as the presulfided Catalyst D in comparison of the octane number of the reformed liquid product using the corresponding catalyst.

FIG. 3 demonstrates that slightly higher liquid product yield can be achieved by the catalyst of this invention when prepared as in Catalyst A using the smaller silica gel particle size passing 325 mesh, in comparison to Catalyst C prepared using silica gel particles passing 100 mesh but retained by 200 mesh (U.S. Sieve Series).

Overall, the catalyst of this invention comprising a rhenium component supported on silica and platinum group metal component on both the silica and on an alumina component in composite can eliminate the need for presulfiding treatment required by conventional rhenium-promoted catalyst in order to prevent excessive hydrocracking activity in reforming service, without comparative loss in reforming performance.

We claim:

1. A hydrocarbon conversion catalyst comprising at least one platinum-group metal deposited on a composite comprising (1) alumina and (2) rhenium deposited on silica.

2. The catalyst of claim 1 wherein said alumina is substantially free from rhenium deposited thereon.

3. The catalyst of claim 1 comprising said silica in an amount within the range of about 5-35 wt. % based upon the total weight of the catalyst.

4. The catalyst of claim 1 wherein said platinum-group metal comprises platinum.

5. The catalyst of claim 1 wherein said catalyst comprises about 0.01-3 wt. % rhenium, about 0.01-3 wt. % platinum, each being calculated as the element, about 5-35 wt. % silica, and about 65-95 wt. % alumina.

6. The catalyst of claim 1 wherein said catalyst comprises about 0.2-0.7 wt. % rhenium and about 0.2-0.7 wt. % platinum, each being calculated as the element, about 15-25 wt. % silica, about 75-85 wt. % alumina and wherein said catalyst further comprises about 0.1-1 wt. % chlorine.

7. A method for preparing the catalyst according to claim 1, 2, 3, 4, 5 or 6, which method comprises:
   (1) forming a composition comprising rhenium deposited on silica;
   (2) drying the composition of step (1);
   (3) forming a composition comprising the product of step 2 and an alumina component;
   (4) impregnating the composition of step 3 with a solution comprising platinum-group metal; and
   (5) calcining the product of step 4.

8. The method of claim 7 wherein the composition of step 3 is formed by blending the product of step 2 with alumina sol, gelling the resulting blend and drying the gelled blend.

9. The method of claim 7 wherein prior to calcining in step 5, the product of step 4 is impregnated with hydrochloric acid.

* * * * *